(12) United States Patent
Nakamoto et al.

(10) Patent No.: US 7,648,554 B2
(45) Date of Patent: Jan. 19, 2010

(54) METAL NANOPARTICLES AND METHOD FOR MANUFACTURING SAME

(75) Inventors: Masami Nakamoto, Takarazuka (JP); Mari Yamamoto, Osaka (JP); Akio Harada, Osaka (JP)

(73) Assignees: Daiken Chemical Co., Ltd., Osaka (JP); Osaka Municipal Technical Research Institute, Osaka (JP)

( * ) Notice: Subject to any disclaimer, the term of this patent is extended or adjusted under 35 U.S.C. 154(b) by 362 days.

(21) Appl. No.: 10/522,941

(22) PCT Filed: Aug. 1, 2003

(86) PCT No.: PCT/JP03/09782

§ 371 (c)(1),
(2), (4) Date: Aug. 31, 2005

(87) PCT Pub. No.: WO2004/012884

PCT Pub. Date: Feb. 12, 2004

(65) Prior Publication Data

US 2006/0150776 A1    Jul. 13, 2006

(30) Foreign Application Priority Data

Aug. 1, 2002    (JP)    ................. 2002-224440
Feb. 13, 2003   (JP)    ................. 2003-034874

(51) Int. Cl.
*B22F 9/20*    (2006.01)
(52) U.S. Cl. ............................. 75/343; 75/362; 977/896
(58) Field of Classification Search .................... 75/362, 75/371
See application file for complete search history.

(56) References Cited

U.S. PATENT DOCUMENTS

| 5,882,722 | A | 3/1999 | Kydd |
| 6,030,889 | A | 2/2000 | Aulicino et al. |
| 6,143,356 | A | 11/2000 | Jablonski |
| 6,197,720 | B1 | 3/2001 | Heineke et al. |
| 6,262,129 | B1 * | 7/2001 | Murray et al. ................. 516/33 |
| 6,676,729 | B2 * | 1/2004 | Sun ............................. 75/348 |
| 6,753,108 | B1 * | 6/2004 | Hampden-Smith et al. .... 429/44 |
| 6,878,445 | B2 * | 4/2005 | Hattori et al. ................ 428/402 |
| 7,135,055 | B2 * | 11/2006 | Mirkin et al. ................. 75/343 |

(Continued)

FOREIGN PATENT DOCUMENTS

EP    0 920 912 A1    6/1999

(Continued)

OTHER PUBLICATIONS

Supplementary European Search Report issued on the corresponding European Patent Application No. 03766686.4, dated Jul. 4, 2007.

(Continued)

*Primary Examiner*—George Wyszomierski
(74) *Attorney, Agent, or Firm*—Knobbe Martens Olson & Bear LLP

(57) ABSTRACT

The main object of the present invention is to manufacture, on an industrial scale, metal nanoparticles with excellent dispersion stability, and therefore provides metal nanoparticles containing a metal component, further containing at least one of phosphorus, nitrogen, and oxygen, and the average particle size being from 1 to 100 nm.

7 Claims, 9 Drawing Sheets

U.S. PATENT DOCUMENTS

2002/0018896 A1    2/2002    Fukunaga et al.

FOREIGN PATENT DOCUMENTS

| | | |
|---|---|---|
| EP | 0 977 212 A2 | 2/2000 |
| JP | 51-122655 A | 10/1976 |
| JP | 51-140860 | 12/1976 |
| JP | 03-267301 | 11/1991 |
| JP | 2001-131603 | 5/2001 |
| TW | 488974 | 6/2002 |
| WO | WO 97/24224 | 7/1997 |
| WO | WO-2004/105985 A1 * | 12/2004 |

OTHER PUBLICATIONS

Supplementary Partial European Search Report issued on the corresponding European Patent Application No. 03766686, dated May 9, 2007.

* cited by examiner

Fig. 5 continued

| Sample | M76-1 | | | File name | yamamoto/M76-1 | [2]:Ka2 Subtract | Orig [1]:Smooth |
|---|---|---|---|---|---|---|---|
| X-ray generator : 18KW | Divergence Slit : 0.50 | deg | | Smoothing | | Peak Search | |
| Target : 1.54056 A (Cu) | Scattering Slit : 0.50 | deg | | Data points : 7 | | Data points : 0 | |
| Monochromator : use | Receiving Slit : 0.15 | mm | | Threshold : 1.00 | | Threshold : 0 | |
| KV : 40.0 KV | Attachment : no use | | | Background subtraction | | Operator | |
| mA : 50.0 mA | | | | Data points : 0 | | Measuring Date : 102 4.19 14:10:5 | |
| Sampling Width : 0.0200 deg | | | | Repeating times: 0 | | Operating Date : 102 4.19 14:49:52 | |
| Scanning Speed : 4.0000 deg/min | | | | Comment : | | | |

METAL NANOPARTICLES AND METHOD FOR MANUFACTURING SAME

This application is the U.S. National Phase under 35 U.S.C. §371 of International Application PCT/JP2003/009782, filed Aug. 1, 2003, which claims priority to Japanese Patent Application No. 2002-224440, filed Aug. 1, 2002 and No. 2003-34874, filed Feb. 13, 2003. The International Application was not published under PCT Article 21(2) in English.

TECHNICAL FIELD

This invention relates to metal nanoparticles and to a method for manufacturing these metal nanoparticles.

BACKGROUND ART

Metal nanoparticles, whose particle diameter is less than 100 nm, are very different from ordinary particles in terms of their characteristics. For instance, with gold (Au), it is known that once the particle diameter drops below 10 nm, the sintering temperature drops to under 200° C., which is far lower than the melting point.

Because their characteristics include catalytic action, these metal nanoparticles have promising applications in a variety of fields in the future. Anticipation is particularly keen regarding the use of metal nanoparticles as the main component of materials used to form electronic wiring, because of the need for higher speed and density in electronic components. In this regard there have been studies aimed at practical applications that would take advantage of the low temperature sinterability of metal nanoparticles in polyimide or ordinary organic substrates, rather than just materials such as ceramic or glass that have been used up to now.

One of the known methods for manufacturing metal nanoparticles is to obtain metal nanoparticles in the vapor phase by evaporating the raw material metal under a vacuum and in the presence of a small amount of an expensive inert gas such as helium.

According to this method, however, the amount of metal nanoparticles produced at one time is generally small. Also, because an apparatus such as an electron beam, plasma generator, laser, or inductive heater is required in order to evaporate the metal, this method is not very well suited to mass production. Furthermore, a drawback to metal nanoparticles obtained by these vapor phase methods is that when they are taken out as a solid, they tend to agglomerate.

A method for preparing metal nanoparticles from the liquid phase has also been proposed as an alternative to the above-mentioned vapor phase methods. For instance, one known method is to manufacture metal nanoparticles by reducing an ammoniacal silver nitrate complex solution in a hydrophobic reaction tank. Nevertheless, even metal nanoparticles obtained by a liquid phase method have a relatively strong tendency to agglomerate.

Also, these methods, almost without exception, require the addition of a surfactant to form a protective colloid in order for the particles to remain dispersed stably, but even so there is room for improvement in terms of dispersion stability.

DISCLOSURE OF THE INVENTION

Thus, at present there is a real need for the development of even newer technology in the industrial-scale production of metal nanoparticles with excellent dispersion stability.

Therefore, it is the main object of the present invention to manufacture, on an industrial scale, metal nanoparticles with excellent dispersion stability.

The inventors conducted diligent research in light of the above problems encountered with prior art, and as a result arrived at the present invention upon discovering that metal nanoparticles obtained by a specific manufacturing method exhibit distinctive properties based on the unique structure of these particles.

Specifically, the present invention relates to the following metal nanoparticles and to a method for manufacturing these metal nanoparticles.

(1) Metal Nanoparticles

The metal nanoparticles of the present invention are metal nanoparticles containing a metal component, further contain at least one of P(phosphorus), N(nitrogen), and O(oxygen), and the average particle diameter is from 1 to 100 nm.

There are no limitations on the type of metal component, which can be suitably selected according to the intended application of the final product and other such considerations. With the present invention, a transition metal is particularly favorable. For example, at least one of Au, Ag, Pt, Pd, Ru, Rh, Os, Ir, Ni, Cu, Zn, Cd, Co, Mn, and Pb can be used. Of these, noble metals are particularly favorable. Specifically, at least one of Au, Ag, Pt, Pd, Ru, Rh, Os, and Ir can be used favorably.

In addition to elemental forms of various metals, the metal component may also be a mixture of these metals, or an intermetal compound or alloy of two or more different metals.

The amount in which the metal component is contained will vary with the intended application of the final product, the size of the resulting particles, and so forth, but is usually about 60 to 98 wt %, with 75 to 98 wt % being particularly favorable. A characteristic feature of the present invention is that dispersibility in organic solvents and the like will be excellent even at a high metal content of 80 wt % or higher.

The remainder is generally made up of substances containing nitrogen and/or oxygen (and preferably organic components containing one or more of phosphorus, nitrogen, and oxygen). The presence of these components improves the dispersion stability of the metal nanoparticles. With the present invention, carbon, hydrogen, and other such components may also be contained, as long as they do not hinder this dispersion stability.

The average particle diameter of the metal nanoparticles of the present invention is usually about 1 to 100 nm, and preferably 1 to 50 nm, and even more preferably 5 to 30 nm, but can be suitably set according to the type of metal component, the intended application of the final product, and so forth.

(2) Method for Manufacturing Metal Nanoparticles

The metal nanoparticles of the present invention can be manufactured by heat treating a starting material containing a metal salt in the presence of an amine compound and in an inert gas atmosphere (hereinafter referred to as the "first method").

These metal nanoparticles can also be manufactured by heat treating a metal complex having a phosphine ligand and a carboxylate ligand in an inert gas atmosphere (hereinafter referred to as the "second method").

Further, these metal nanoparticles can be manufactured by heat treating a mixture containing (1) phosphine and (2) a) a metal salt of a fatty acid or b) a fatty acid and a metal salt in an inert gas atmosphere (hereinafter referred to as the "third method").

First Method

The first method involves heat treating a starting material containing a metal salt in the presence of an amine compound and in an inert gas atmosphere.

The metal salt can be, for example, a nitrate, chloride, carbonate, sulfate, or other such inorganic acid salt; a stearate, myristate, or other such organic acid salt; or a metal complex (complex salt). In the present invention, it is particularly favorable to use one or more metal salts selected from among (1) metal carbonates, (2) fatty acid salts, and (3) metal complexes.

The fatty acid salt is preferably a metal salt of a fatty acid expressed by $R^1$—COOH or HOOC—$R^1$—COOH (where $R^1$ is a $C_7$ or higher (and particularly $C_7$ to $C_{17}$) hydrocarbon group that may have a substituent) or HOOC—$R^2$—COOH (where $R^2$ is a $C_3$ or higher hydrocarbon group that may have a substituent). The above-mentioned hydrocarbon groups $R^1$ and $R^2$ may be either saturated or unsaturated.

The metal complex is preferably a metal complex that contains a carboxylate ligand. This metal complex may be either a monodentate ligand expressed by $R^1COO$ (where $R^1$ is a $C_7$ or higher hydrocarbon group that may have a substituent) or a bidentate ligand (including a chelate ligand) expressed by OOC—$R^2$—COO (where $R^2$ is a hydrocarbon group). In the case of a monodentate ligand, a linear alkyl group is preferred. In the case of a bidentate ligand, a linear methylene group is preferred. The above-mentioned hydrocarbon group $R^1$ preferably has a carbon number of 7 to 30, with a carbon number of 7 to 17 being even better. The above-mentioned hydrocarbon group $R^2$ may be either a saturated hydrocarbon group such as a methylene group, or an unsaturated hydrocarbon group such as a phenyl group, propylene group, or vinylene group. There are no restrictions on the carbon number of the above-mentioned hydrocarbon group $R^2$, but about 6 to 12 is favorable.

As long as it has a carboxylate ligand, the metal complex may also have another ligand such as a phosphine ligand.

The following complexes a) and b) can be used favorably as the metal complex in the present invention.

a) $M(R^1R^2R^3P)(O_2CR')$ (Where M is Au, Ag, or Cu; and $R^1$ to $R^3$ and R' are mutually the same or different and are each a cyclohexyl group, phenyl group, or $C_1$ to $C_{30}$ alkyl group, and may have a substituent.)

b) $M'(R^1R^2R^3P)_2(O_2CR')_2$ (Where M is Pt, Pd, or Ni; and $R^1$ to $R^3$ are mutually the same or different and are each a cyclohexyl group, phenyl group, or $C_1$ to $C_{30}$ alkyl group, and may have a substituent.)

Examples of the above-mentioned substituent in a) and b) include a methyl group, ethyl group, propyl group, sulfone group, OH group, nitro group, amino group, halogen group (Cl, Br, etc.), methoxy group, and ethoxy group. There are no particular restrictions on the position or number of substituents.

Of these, a metal complex expressed by $M(PPh_3)(O_2CC_nH_{2n+1})$ (where M is Au, Ag, or Cu, Ph is a phenyl group, and n is an integer from 7 to 17) or $M'_2(PPh_3)_2(O_2CC_nH_{2n+1})$ (where M' is Pt, Pd, or Ni, Ph is a phenyl group, and n is an integer from 7 to 17) can be used to advantage.

The type of metal component in the metal salt can be suitably selected according to the intended application of the final product and so on. The metal component may be a single type or a combination of two or more types. Specifically, when the starting material is a metal complex, two or more types of metal component may be contained in a single metal complex. When a metal complex consisting of two or more types of metal component contained in a single metal complex is used, or when two or more types of starting material each containing different metal components are used, it is possible to manufacture metal nanoparticles of a mixture containing these metal components, or an intermetal compound or alloy of two or more different metals.

Also, the starting material can contain other components as needed with the present invention. For instance, a fatty acid or salt thereof can be added. It is preferable for the fatty acid to be the same as the one used in the above-mentioned fatty acid salt. The amount in which these other components are contained and so forth can be suitably set according to the type of starting material being used and so on.

With the manufacturing method of the present invention, a starting material containing the above-mentioned metal component is heat treated in an inert gas atmosphere and in the presence of an amine compound. In particular, with the present invention, the starting material containing a metal component may be merely charged along with an amine into a reaction vessel and heat treated, without the use of an organic solvent. If the amine is a solid, the amine and the starting material containing a metal component may be heat treated while still solid.

There are no particular restrictions on the type of amine compound used here, which may be a primary amine, secondary amine, or tertiary amine.

It is particularly favorable for the primary amine to be one expressed by the general formula $RNH_2$ (where R is a $C_8$ or higher hydrocarbon group). Examples include octylamine ($C_8H_{17}NH_2$), laurylamine ($C_{12}H_{25}NH_2$), and stearylamine ($C_{18}H_{37}NH_2$).

It is particularly favorable for the secondary amine to be one expressed by the general formula $R^1R^2NH$ (where $R^1$ and $R^2$ are mutually the same or different and are each a $C_2$ to $C_8$ hydrocarbon group). Examples include diethylamine (($C_2H_5)_2$ NH), dihexylamine (($C_6H_{13})_2NH$), and dioctylamine (($C_8H_{17})_2NH$).

It is particularly favorable for the tertiary amine to be one expressed by the general formula $R^1R^2R^3N$ (where $R^1$ through $R^2$ are mutually the same or different and are each a $C_2$ to $C_8$ hydrocarbon group). Examples include triethylamine (($C_2H_5)_3N$), tripropylamine (($C_3H_7)_3N$), and tripropylamine (($C_8H_{17})_3N$).

There are no particular restrictions on the amount in which the amine compound is used, as long as it is at least a molar equivalent with the starting material containing a metal component. Therefore, an excess amount may be used as needed. The amine compound can also be used after first being dissolved or dispersed in a suitable organic solvent.

There are no particular restrictions on the heat treatment temperature, as long as the metal salt reacts with the amine compound to yield the desired metal nanoparticles, and the temperature can be suitably determined according to the metal salt being used, the type of amine compound, and so forth. The temperature generally may be set to 50° C. or higher, and it is particularly favorable for the temperature to be high enough that the mixture of the starting material and the amine compound will end up in liquid form, but be lower than the melting point of the amine compound. Specifically, performing a heat treat at a temperature high enough that the above-mentioned mixture ends up being entirely in molten form effectively promotes the formation of metal nanoparticles made up of a substance containing one or more of phosphorus, nitrogen, and oxygen.

The heat treatment duration may be suitably set according to the type of starting material being used, the heat treatment temperature, and so forth, but is usually about 1 to 10 hours, and preferably 3 to 8 hours.

The heat treatment may be conducted in an inert gas atmosphere. For example, an inert gas of nitrogen, carbon dioxide, argon, helium, or the like may be used.

After the heat treatment, refining may be conducted if necessary. The refining can be carried out by various methods including conventional ones, for example, washing, centrifugal separation, film refining, and solvent extraction.

Second Method

The second method involves heat treating a metal complex having a phosphine ligand and a carboxylate ligand in an inert gas atmosphere.

The metal complex used here is one having a phosphine ligand and a carboxylate ligand. The metal complex may be a single type or a combination of two or more types. When two or more types of metal complex are used, it is possible to manufacture metal nanoparticles of an intermetal compound or alloy containing these metal components.

The central metal of the metal complex can be suitably selected according to the intended application of the final product and so forth. The central metal may be a single type or a combination of two or more types (that is, it may be a metal complex containing two or more types of metal component in a single metal complex). When a metal complex consisting of two or more types of metal component contained in a single metal complex is used, it is possible to manufacture metal nanoparticles of an intermetal compound or alloy containing these metal components.

There are no restrictions on the coordination number of the metal complex used here, and [the complex] may be a two-coordinate complex of Au, Ag, Cu, or the like, or a tetra-coordinate complex of Ni, Pd, Pt, or the like, for example.

The phosphine ligand may be either a primary phosphine, secondary phosphine, or tertiary phosphine. A tertiary phosphine is particularly favorable with the present invention. It is particularly favorable for the tertiary phosphine to be one expressed by one of the following general formulas a) to c).

a) Monodentate ligands expressed by the general formula $(P(R^1)(R^2)(R^3))$ (where $R^1$ to $R^3$ are mutually the same or different and are each a cyclohexyl group, phenyl group, or $C_1$ to $C_{18}$ alkyl group, and may have a substituent).

b) Bidentate ligands expressed by the general formula $((R^1)(R^2)P(CH_2)_nP(R^1)(R^2))$ (where n is an integer from 1 to 10, and $R^1$ and $R^2$ are mutually the same or different and are each a cyclohexyl group, phenyl group, or $C_1$ to $C_{18}$ alkyl group, and may have a substituent).

c) Tridentate ligands expressed by the general formula $((R^1)(R^2)P(CH_2)_nP(R^3)(CH_2)_nP(R^1)(R^2))$ (where n is an integer from 1 to 10, and $R^1$ to $R^3$ are mutually the same or different and are each a cyclohexyl group, phenyl group, or $C_1$ to $C_{18}$ alkyl group, and may have a substituent).

There are no restrictions on the type of substituent in General Formulas a) to b), but examples include a methyl group, ethyl group, propyl group, sulfone group, OH group, nitro group, amino group, halogen group (Cl, Br, etc.), methoxy group, and ethoxy group. Nor are there any particular restrictions on the position or number of substituents.

There are no restrictions on the carboxylate ligand, as long as it is a monodentate ligand expressed by the general formula RCOO (where R is a hydrocarbon group) or a bidentate ligand (including a chelate ligand) expressed by the general formula OOC—R—COO (where R is a hydrocarbon group).

The above-mentioned hydrocarbon group R preferably has a carbon number of 1 to 30, and especially a carbon number of 1 to 12. The above-mentioned hydrocarbon group may be either a saturated hydrocarbon group such as a methyl group, ethyl group, propyl group, methylene group, ethylene group, or trimethylene group, or an unsaturated hydrocarbon group such as a phenyl group, propylene group, or vinylene group. It is particularly favorable with the present invention to use a linear alkyl group (in the case of a monodentate ligand) or a linear alkylene group (in the case of a bidentate ligand).

The metal complex of the present invention may be one having these ligands. It is particularly desirable to use a metal complex having no ligands other than a phosphine ligand and a carboxylate ligand.

The following complexes a) and b) can be used favorably as the metal complex in the present invention.

a) $M(R^1R^2R^3P)(O_2CR')$ (Where M is Au, Ag, or Cu; and $R^1$ to $R^3$ and R' are mutually the same or different and are each a cyclohexyl group, phenyl group, or $C_1$ to $C_{18}$ alkyl group, and may have a substituent.)

b) $M'(R^1R^2R^3)_2(O_2CR')_2$ (Where M' is Pt, Pd, or Ni; and $R^1$ to $R^3$ and R' are mutually the same or different and are each a cyclohexyl group, phenyl group, or $C_1$ to $C_{18}$ alkyl group, and may have a substituent.)

Examples of the above-mentioned substituent in a) and b) include a methyl group, ethyl group, propyl group, sulfone group, OH group, nitro group, amino group, halogen group (Cl, Br, etc.), methoxy group, and ethoxy group. There are no particular restrictions on the position or number of substituents.

With the present invention, of the above, it is preferable to use at least one type of metal complex expressed by $M(PPh_3)(O_2CC_nH_{2n+1})$ (where M is Au, Ag, or Cu, Ph is a phenyl group, and n is an integer from 7 to 17) or $M'_2(PPh_3)_2(O_2CC_nH_{2n+1})$ (where M' is Pt, Pd, or Ni, Ph is a phenyl group, and n is an integer from 7 to 17).

With the manufacturing method of the present invention, the above-mentioned metal complex is heat treated in an inert gas atmosphere. It is particularly favorable with the present invention to heat treat the metal complex while it is still a solid.

There are no particular restrictions on the heat treatment temperature, as long as the desired metal nanoparticles are obtained, but it is preferable for the temperature to be such that when this metal complex is subjected to thermogravimetric analysis (TG analysis), the weight reduction is from 1 to 50% (and especially 5 to 20%). Specifically, it is preferable for the heat treatment to be conducted at a temperature at which the initial weight will be reduced by the above-mentioned proportion (%). Performing a heat treat at such a temperature causes the metal complex end up in liquid form, which promotes pyrolysis, and as a result, metal nanoparticles in which phosphorus and oxygen are present along with the specified amount of metal component can be efficiently obtained.

The heat treatment duration may be suitably set according to the type of starting material being used, the heat treatment temperature, and so forth, but is usually about 1 to 10 hours, and preferably 3 to 8 hours.

The heat treatment may be conducted in an inert gas atmosphere. For example, an inert gas of nitrogen, carbon dioxide, argon, helium, or the like may be used.

Upon completion of the heat treatment, refining is performed as needed. This refining can be accomplished by any known refining method, such as washing, centrifuging, membrane refining, and solvent extraction.

Third Method

The third method comprises a step of heat treating a mixture containing (1) phosphine and (2) a) a fatty acid metal salt or b) a fatty acid and a metal salt in an inert gas atmosphere.

In other words, the third method involves using as the raw material a mixture containing phosphine corresponding to the phosphine ligand in the second method and a fatty acid and/or metal salt thereof corresponding to the carboxylate ligand.

There are no particular restrictions on the phosphine, and any kind of phosphine can be used. For example, a phosphine expressed by the general formula $R^1R^2R^3P$ (where $R^1$ through $R^2$ are mutually the same or different and are each a cyclohexyl group, phenyl group, or $C_1$ to $C_{30}$ alkyl group, and may have a substituent group) can be used favorably. More specifically, examples include triphenylphosphine and trimethylphosphine. Examples of the above-mentioned substituent are the same as those for the substituent listed above for the second method.

There are no restrictions on the fatty acid metal salt, but it is particularly favorable to use a metal salt of a fatty acid expressed by the general formula R'—COOH (where R' is a cyclohexyl group, a phenyl group, or a $C_1$ to $C_{18}$ alkyl group, and may have a substituent group). Examples of the above-mentioned substituent group are the same as those for the substituent listed above for the second method.

The metal component may be suitably determined according to the desired type of metal nanoparticles and so forth. For example, when silver nanoparticles are to be manufactured, silver myristate, silver stearate, or the like can be used as the fatty acid metal salt.

With the present invention, a fatty acid or a metal compound can be used instead of the above-mentioned fatty acid metal salt (or along with the fatty acid metal salt). There are no restrictions on the fatty acid, but it is particularly favorable to use a fatty acid expressed by the above-mentioned general formula R'—COOH (where R' is a cyclohexyl group, a phenyl group, or a $C_1$ to $C_{18}$ alkyl group, and may have a substituent).

There are no particular restrictions on the metal salt, which can be either an inorganic acid salt or an organic acid salt of a metal. Examples of inorganic acid salts include carbonates, sulfates, chlorides, and nitrates. Examples of organic acid salts include acetates and oxalates.

The proportions in which these are used can be suitably determined according to the type of phosphine being used and so forth, but it is generally preferable for them to be set such that (1) a phosphine and (2) a) a metal salt of a fatty acid or b) a mixture containing a fatty acid and a metal salt are substantially the same in terms of the proportions (molar ratios) of the metal components, phosphine ligands, and carboxylate ligands in the corresponding metal complexes each having a phosphine ligand and a carboxylate ligand. The metal complexes listed as examples in the second method, for example, can be used as these metal complexes.

For instance, when triphenylphosphine is used as the phosphine and silver myristate is used as the fatty acid metal salt, they may be used in the same proportions as in the $Ag(PPh_3)(O_2CC_{13}H_{27})$ that is the corresponding metal complex (specifically, such that triphenylphosphine:fatty acid metal salt=1:1 (molar ratio)).

When triphenylphosphine is used as the phosphine, myristic acid is used as fatty acid, and silver carbonate is used as the metal salt, for example, they may be used in the same proportions as in the $Ag(PPh_3)(O_2CC_{13}H_{27})$ that is the corresponding metal complex (specifically, such that triphenylphosphine:fatty acid:metal salt=1:1:1 (molar ratio)).

Next, a mixture containing these components is heat treated in an inert gas atmosphere. The heat treat method and conditions may be the same as for the heat treatment of the second method. With the third method, the mixture can also be heat treated while still a solid.

Upon completion of the heat treatment, refining is performed as needed. This refining can be accomplished by any known refining method, such as washing, centrifuging, membrane refining, and solvent extraction.

According to the manufacturing method of the present invention, metal particles whose particle size is on the nano-order (metal nanoparticles) can be obtained by heat treating a starting material containing a specific metal component along with an amine compound.

One or more components from among phosphorus, nitrogen, and oxygen are present along with the metal component in the above metal nanoparticles, so dispersion stability is excellent despite the high metal content, and these particles are solubilized when dispersed in a solvent. For instance, in addition to a terpene-based solvent, these metal nanoparticles may also be dispersed in acetone, methanol, ethanol, benzene, toluene, hexane, diethyl ether, kerosene, or another such organic solvent, or they can be used as a paste after being added to a known paste producing agent.

These metal nanoparticles of the present invention can be used in a wide range of applications, including electronic materials (such as printed circuit boards, conductive materials, electrode materials), magnetic materials (such as magnetic recording media, electromagnetic wave absorbents, and electromagnetic wave resonators), catalyst materials (such as high speed reaction catalysts and sensors), structural materials (such as far infrared materials and compound film forming materials), ceramic and metal materials (such as braze materials, sintering auxiliaries, and coating materials), decorative materials for pottery, and medical materials.

BEST MODE FOR CARRYING OUT THE INVENTION

The features of the present invention will now be further clarified through examples, but the scope of the present invention is not limited to the scope of these examples.

The various properties referred to in the examples were measured as follows.

(1) Qualitative Analysis

Identification of the metal components was performed by power X-ray diffraction analysis using a powerful X-ray diffraction apparatus ("MXP18" made by MAC Science).

(2) Average Particle Diameter

Particle size was measured with a transmission electron microscope (TEM) ("JEM1200EX" made by JEOL), the mathematical average size was found for 100 particles chosen at random, and this value was termed the average particle diameter.

(3) Metal Component Content

This was found by TG/DTA analysis using a thermal analyzer ("SSC/5200" made by Seiko Instruments).

(4) Analysis of Organic Components, etc.

The phosphorus, nitrogen, and oxygen components in the metal nanoparticles were confirmed by X-ray photoelectron spectroscopy ("ESCA-700" made by ULVAC-PHI) and FT-IR apparatus ("GX I-RO" made by Perkin-Elmer). The organic components were confirmed using an FT-NMR apparatus ("JNM-EX270" made by JEOL) and a GC/MS (gas chromatography mass spectrum) apparatus ("5973 Network MSD" made by Hewlett-Packard).

EXAMPLE 1-1

6.4 g (23.2 mmol) of silver carbonate and 7.9 g (42.7 mmol) of laurylamine (n-$C_{12}H_{25}NH_2$) were placed while still in solid form in a three-neck Pyrex flask, and were gradually heated to 120° C. under a nitrogen atmosphere. The temperature was held at 120° C. for 5 hours, after which the contents were allowed to cool to 70° C., then washed several times with methanol, the powder thus produced was filtered off with a Kiriyama funnel, and this powder was dried under reduced pressure, which gave a dark bluish-green powder (98% yield).

The powder thus obtained was subjected to TEM observation and thermal analysis. FIG. 1 shows the results (image) of TEM observation. Thermal analysis revealed that this powder consisted of silver nanoparticles containing 93.4 wt % silver as the metal component, and in which 6.6 wt % organic component was present. The core was identified as silver by powder X-ray diffraction analysis. These metal nanoparticles had an average particle diameter of 7.9 nm.

As to organic components, NMR revealed that a signal for the NH groups of the amine appeared near 1.5 ppm (using TMS as an internal standard), and signals for methylene and methyl groups appeared at 1.26 ppm and 0.88 ppm, respectively. GC/MS revealed a parent peak corresponding to a mass number of 185 for laurylamine, and confirmed that the above-mentioned silver nanoparticles were protected by an amine.

EXAMPLE 1-2

6.4 g (23.2 mmol) of silver carbonate and 7.9 g (42.7 mmol) of laurylamine (n-$C_{12}H_{25}NH_2$) were placed while still in solid form in a three-neck Pyrex flask. 6.7 g (46.7 mmol) of octanoic acid was added, and the contents were gradually heated to 150° C. under a nitrogen atmosphere. The temperature was held at 150° C. for 5 hours, after which the contents were allowed to cool to 70° C., then washed several times with methanol, the powder thus produced was filtered off with a Kiriyama funnel, and this powder was dried under reduced pressure, which gave a silvery-yellow powder (76% yield).

The powder thus obtained was subjected to TEM observation and thermal analysis. Thermal analysis revealed that this powder consisted of silver nanoparticles containing 94.9 wt % silver as the metal component, and in which 5.1 wt % organic component was present. The core was identified as silver by powder X-ray diffraction analysis. These metal nanoparticles had an average particle diameter of 8.2 nm.

The presence of amine and octanoic acid (as organic components) was confirmed by NMR and GC/MS in the same manner as in Example 1-1.

EXAMPLE 1-3

7.5 g (27.2 mmol) of silver carbonate ($Ag_2CO_3$) and 7.4 g (57.6 mmol) of octylamine (n-$C_8H_{17}NH_2$) were placed in a three-neck Pyrex flask, and the contents were gradually heated to 110° C. under a nitrogen atmosphere. The temperature was held at 110° C. for 5 hours, and after this heat treatment, 25 mL of methanol was added at room temperature, the contents were stirred and then allowed to stand, and the supernatant was removed. This procedure was repeated four times, and the powder thus produced was filtered off with a Kiriyama funnel and dried under reduced pressure, which gave black silver nanoparticles (98.7% yield).

The average particle diameter of the silver nanoparticles thus obtained was 16.9 nm. The silver content was 98.0 wt %.

EXAMPLE 1-4

6.0 g (21.8 mmol) of silver carbonate ($Ag_2CO_3$), 5.6 g (43.6 mmol) of octylamine (n-$C_8H_{17}NH_2$), and 6.3 g (43.9 mmol) of octanoic acid ($C_7H_{15}CO_2H$) were placed in a three-neck Pyrex flask, and the contents were gradually heated to 120° C. under stirring and in a nitrogen gas flow. The temperature was held at 120° C. for 5 hours, and after this heat treatment, 25 mL of methanol was added at room temperature, the contents were stirred and then allowed to stand, and the supernatant was removed. This procedure was repeated four times, and the powder thus produced was filtered off with a Kiriyama funnel and dried under reduced pressure, which gave grayish-greenish-black silver nanoparticles (90.3% yield).

The average particle diameter of the silver nanoparticles thus obtained was 32.7 nm. The silver content was 98.6 wt %.

EXAMPLE 1-5

6.9 g (25.0 mmol) of silver carbonate ($Ag_2CO_3$), 9.7 g (52.6 mmol) of laurylamine (n-$C_{12}H_{25}NH_2$), and 12.0 g (52.5 mmol) of myristic acid ($C_{13}H_{27}CO_2H$) were placed in a three-neck Pyrex flask, and the contents were gradually heated to 125° C. under stirring and in a nitrogen gas flow. The temperature was held at 125° C. for 7 hours, and after this heat treatment, 25 mL of methanol was added at room temperature, the contents were stirred and then allowed to stand, and the supernatant was removed. This procedure was repeated five times, and the powder thus produced was filtered off with a Kiriyama funnel and dried under reduced pressure, which gave grayish-greenish-black silver nanoparticles (97.4% yield).

The average particle diameter of the silver nanoparticles thus obtained was 11.7 nm. The silver content was 89.4 wt %.

EXAMPLE 1-6

2.5 g (7.5 mmol) of silver myristate ($C_{13}H_{27}CO_2Ag$) and 1.4 g (7.6 mmol) of laurylamine ($C_{12}H_{25}NH_2$) were placed while still in solid form in a three-neck Pyrex flask, and the contents were gradually heated to 120° C. under a nitrogen atmosphere. The temperature was held at 120° C. for 5 hours, after which the contents were allowed to cool to 70° C., then washed several times with methanol, the powder thus produced was filtered off with a Kiriyama funnel, and this powder was dried under reduced pressure, which gave a dark reddish-brown powder (71% yield).

The powder thus obtained was analyzed in the same manner as in Example 1-1. As a result, the above powder was confirmed to be composed of metal nanoparticles containing silver as the metal component. These metal nanoparticles had an average particle diameter of 5.4 nm. The silver content was 66.6 wt %. NMR revealed that signals for methylene-groups and methyl groups appeared between 2.9 and 2.1 ppm and 1.53 and 1.26 ppm and at 0.88 ppm, respectively (using TMS as an internal standard), which confirmed that the above-mentioned silver nanoparticles had a protective layer consisting of an organic component containing oxygen.

EXAMPLE 1-7

1.67 g (5 mmol) of silver myristate ($C_{13}H_{27}CO_2Ag$) and 15 mL of triethylamine ($NEt_3$) were put in a two-neck flask and reacted for 2 hours at 80° C. under a nitrogen atmosphere. Acetone was added to the reaction solution to precipitate a brown powder, after which this powder was filtered off with a Kiriyama funnel, washed several times with acetone, and then dried under reduced pressure, which gave a dark blue powder (89% yield).

The powder thus obtained was subjected to TEM observation, powder X-ray diffraction analysis, and UV-Vis spectrum measurement. FIG. 2 shows the results (image) of TEM observation.

These results confirmed that the above-mentioned powder was composed of metal nanoparticles containing silver as the metal component. These metal nanoparticles had an average particle diameter of 4.4 nm. The silver content was 83 wt %. GC/MS and NMR confirmed that the protective layer of the silver nanoparticles was a myristate ligand. In the X-ray photoelectronic spectrum, a peak of O1s was seen at 531 eV.

EXAMPLE 1-8

1.68 g (5 mmol) of silver myristate ($C_{13}H_{27}CO_2Ag$) and 11 mL of trioctylamine ($N(C_8H_{17})_3$) were put in a two-neck flask and reacted for 2 hours at 80° C. under a nitrogen atmosphere. Acetone was added to the reaction solution to precipitate a brown powder, after which this powder was filtered off with a Kiriyama funnel, washed several times with acetone, and then dried under reduced pressure, which gave a dark blue powder (81% yield).

These metal nanoparticles had an average particle diameter of 3.6 nm. The silver content was 79 wt %.

EXAMPLE 1-9

2.51 g (10 mmol) of silver octanoate ($C_7H_{15}CO_2Ag$) and 20 mL of triethylamine ($NEt_3$) were put in a two-neck flask and reacted for 2 hours at 80° C. under a nitrogen atmosphere. Acetone was added to the reaction solution to precipitate a brown powder, after which this powder was filtered off with a Kiriyama funnel, washed several times with acetone, and then dried under reduced pressure, which gave a dark blue powder (89% yield).

These metal nanoparticles had an average particle diameter of 15.4 nm. The silver content was 94 wt %.

EXAMPLE 1-10

1.26 g (5 mmol) of silver octanoate ($C_7H_{15}CO_2Ag$) and 15 mL of trioctylamine ($N(C_8H_{17})_3$) were put in a two-neck flask and reacted for 2 hours at 80° C. under a nitrogen atmosphere. Acetone was added to the reaction solution to precipitate a brown powder, after which this powder was filtered off with a Kiriyama funnel, washed several times with acetone, and then dried under reduced pressure, which gave a dark blue powder (96% yield).

These metal nanoparticles had an average particle diameter of 5.1 nm. The silver content was 91 wt %.

EXAMPLE 1-11

2.07 g (5 mmol) of silver stearate ($C_{17}H_{35}CO_2Ag$) and 15 mL of triethylamine ($NEt_3$) were put in a two-neck flask and reacted for 2 hours at 80° C. under a nitrogen atmosphere. Acetone was added to the reaction solution to precipitate a brown powder, after which this powder was filtered off with a Kiriyama funnel, washed several times with acetone, and then dried under reduced pressure, which gave a dark blue powder (94% yield).

These metal nanoparticles had an average particle diameter of 2.8 nm. The silver content was 75 wt %.

EXAMPLE 1-12

2.07 g (5 mmol) of silver stearate ($C_{17}H_{35}CO_2Ag$) and 15 mL of trioctylamine ($N(C_8H_{17})_3$) were put in a two-neck flask and reacted for 2 hours at 80° C. under a nitrogen atmosphere. Acetone was added to the reaction solution to precipitate a brown powder, after which this powder was filtered off with a Kiriyama funnel, washed several times with acetone, and then dried under reduced pressure, which gave a dark blue powder (73% yield).

These metal nanoparticles had an average particle diameter of 4.4 nm. The silver content was 74 wt %.

EXAMPLE 1-13

0.68 g (2 mmol) of silver myristate ($C_{13}H_{27}CO_2Ag$), 1.41 g (2 mmol) of a gold(I)-carboxylate complex ($Au(PPh_3)$)($C_{13}H_{27}CO_2$)), and 10 mL of triethylamine ($NEt_3$) were put in a two-neck flask and reacted for 2 hours at 80° C. under a nitrogen atmosphere. Acetone was added to the reaction solution to precipitate a brown powder, after which this powder was filtered off with a Kiriyama funnel, washed several times with acetone, and then dried under reduced pressure, which gave a dark green powder (93% yield).

The powder thus obtained was subjected to TEM observation, powder X-ray diffraction analysis, and UV-Vis spectrum measurement. FIG. 3 shows the results (image) of TEM observation.

The TEM micrograph revealed these metal nanoparticles to have an average particle diameter of 3.6 nm. The X-ray photoelectronic spectrum revealed peaks at Au $4f_{7/2}$ 84.3 eV and Ag $3d_{5/2}$ 368.2 eV, and the compositional ratio at the nanoparticle surface was 46:54, so gold and silver were contained in proportions corresponding to their supply ratio. In the UV-Vis spectrum, a single absorption maximum was observed at 488 nm. This clearly indicated that nanoparticles of a gold/silver alloy had been produced, rather than a mixture of gold nanoparticles and silver nanoparticles. Thermal analysis revealed the metal component content to be 89 wt %. GC/MS and NMR confirmed the presence of myristate ligands and small amounts of $PPh_3$ and O=$PPh_3$ in the protective layer of the gold/silver alloy nanoparticles. In the X-ray photoelectronic spectrum, a peak of O1s was seen at 530.1 eV.

EXAMPLE 2-1

51.5 g (75 mmol) of metal complex ($Au(PPh_3)$)($O_2CC_{13}H_{27}$)) was placed while still in solid form in a two-neck Pyrex flask, and was gradually heated to 180° C. under a nitrogen atmosphere. The temperature was held at 180° C. for 5 hours, after which the contents were allowed to cool. The powder thus produced was repeatedly washed with acetone, filtered off with a Kiriyama funnel, and dried under reduced pressure.

The powder thus obtained was subjected to TEM observation, powder X-ray diffraction analysis, and thermal analysis. FIG. 4 shows the results (image) of TEM observation. FIG. 5 shows the results of powder X-ray diffraction analysis. FIG. 6 shows the results of thermal analysis.

These results confirmed that the above-mentioned powder was composed of metal nanoparticles containing gold as the metal component. These metal nanoparticles had an average particle diameter of 23 nm. The gold content was 88 wt %. A signal for the phenyl groups of the phosphine ligands appeared between 7.4 and 7.7 ppm (using TMS as an internal standard), and signals for the methylene and methyl groups of the carboxylate ligands appeared between 3.39 and 3.76 ppm and 1.21 and 1.26 ppm and between 0.83 and 0.88 ppm, respectively. A υ (CO) peak for the carboxylate ligands was observed at 1733 cm$^{-1}$. In the X-ray photoelectron spectrum, peaks for phosphorus and oxygen were observed at 132.1 eV and 532.5 eV, respectively.

EXAMPLE 2-2

1.04 g (2 mmol) of metal complex (Au(PPh$_3$)(O$_2$CCH$_3$)) was placed while still in solid form in a two-neck Pyrex flask, and was gradually heated to 180° C. under a nitrogen atmosphere. The temperature was held between 180 and 200° C. for 5 hours, after which the contents were allowed to cool. The powder thus produced was repeatedly washed with acetone, filtered off with a Kiriyama funnel, and dried under reduced pressure, which gave a brown powder (78% yield).

These gold nanoparticles had an average particle diameter of 81 nm. The gold content was 97 wt %.

EXAMPLE 2-3

0.57 g (0.8 mmol) of metal complex (Au(PPh$_3$) (O$_2$CC$_6$H$_5$).(C$_6$H$_6$)) was placed while still in solid form in a two-neck Pyrex flask, and was gradually heated to 180° C. under a nitrogen atmosphere. The temperature was held at 180° C. for 5 hours, after which the contents were allowed to cool. The powder thus produced was repeatedly washed with acetone, filtered off with a Kiriyama funnel, and dried under reduced pressure, which gave a brown powder (16% yield).

These gold nanoparticles had an average particle diameter of 8.1 nm. The gold content was 83 wt %.

EXAMPLE 2-4

48 g (80.3 mmol) of metal complex (Ag(PPh$_3$) (O$_2$CC$_{13}$H$_{27}$)) was placed while still in solid form in a four-neck Pyrex flask, and was gradually heated to 270° C. under a nitrogen atmosphere. The temperature was held at 270° C. for 8 hours, after which the contents were allowed to cool. The powder thus produced was repeatedly washed with methanol, filtered off with a Kiriyama funnel, and dried under reduced pressure.

The powder thus obtained was analyzed in the same manner as in Example 2-1. As a result, the above powder was confirmed to be composed of metal nanoparticles containing silver as the metal component. These metal nanoparticles had an average particle diameter of 12 nm. The silver content was 91 wt %. NMR revealed that a signal for the phenyl groups of the phosphine ligands and signals for methylene and methyl groups of the carboxylate ligands appeared in the same ranges as in Example 1. A υ (CO) peak for the carboxylate ligands was observed at the same position as in Example 1. Similarly, peaks for phosphorus and oxygen were observed in the X-ray photoelectron spectrum.

EXAMPLE 2-5

3.0 g (4.6 mmol) of metal complex (Ag(PPh$_3$) (O$_2$CC$_{17}$H$_{35}$)) was placed while still in solid form in a three-neck Pyrex flask, was gradually heated to 115° C. under a nitrogen atmosphere, and was completely melted, after which it was gradually heated to 245° C. under stirring, and this temperature was maintained for 6 hours. After this heat treatment, 40 mL of methanol was added at 60° C., the contents were stirred and then allowed to stand, and the supernatant was then removed. This procedure was repeated three times, and the powder thus obtained was filtered off with a Kiriyama funnel and dried under reduced pressure, which gave gray silver nanoparticles (97% yield). The silver content of these silver nanoparticles was 81.7 wt %.

EXAMPLE 2-6

46 g (39.2 mmol) of metal complex (Pt(PPh$_3$)$_2$ (O$_2$CC$_{13}$H$_{27}$)$_2$) was placed while still in solid form in a four-neck Pyrex flask, and was gradually heated to 350° C. under a nitrogen atmosphere. The temperature was held at 350° C. for 8 hours, after which the contents were allowed to cool. The powder thus produced was repeatedly washed with acetone, filtered off with a Kiriyama funnel, and dried under reduced pressure.

The powder thus obtained was analyzed in the same manner as in Example 2-1. As a result, the above powder was confirmed to be composed of metal nanoparticles containing platinum as the metal component. These metal nanoparticles had an average particle diameter of 5 nm. The platinum content was 80 wt %. NMR revealed that a signal for the phenyl groups of the phosphine ligands and signals for methylene and methyl groups of the carboxylate ligands appeared in the same ranges as in Example 1. A υ (CO) peak for the carboxylate ligands was observed at the same position as in Example 1. Similarly, peaks for phosphorus and oxygen were observed in the X-ray photoelectron spectrum.

EXAMPLE 3-1

A mixture of 6.2 g (18.5 mmol) of silver myristate (C$_{13}$H$_{27}$CO$_2$Ag) and 4.9 g (18.5 mmol) of triphenylphosphine (PPh$_3$) in a 1:1 ratio, which can be viewed as the constituent components of a metal complex (Ag(PPh$_3$) (O$_2$CC$_{13}$H$_{27}$)), was placed while still in solid form in a 100 mL three-neck flask, was gradually heated to 130° C. under a nitrogen atmosphere, and was completely melted, after which it was gradually heated to 240° C. under stirring, and this temperature was maintained for 6 hours. After this heat treatment, 50 mL of methanol was added at room temperature, the contents were stirred and then allowed to stand, and the supernatant was then removed. This procedure was repeated four times, and the powder thus obtained was filtered off with a Kiriyama funnel and dried under reduced pressure, which gave black silver nanoparticles (78.3% yield).

FIG. 7 shows the results (image) of TEM observation of the silver nanoparticles thus obtained. The average particle diameter thereof was 8.5 nm. The silver content was 84.3 wt %. XRD revealed the metal core to be metallic silver. The organic components revealed by GC/MS analysis were PPh$_3$ (m/z=262), O=PPh$_3$ (m/z=277), and C$_{13}$H$_{27}$CO$_2$H (m/z=228).

EXAMPLE 3-2

A mixture of 2.5 g (9.1 mmol) of silver carbonate (Ag$_2$CO$_3$), 4.8 g (18.1 mmol) of myristic acid (C$_{13}$H$_{27}$CO$_2$H), and 4.1 g (18.1 mmol) of triphenylphosphine (PPh$_3$) in a 1:2:2 ratio, as the constituent components of a metal complex (Ag(PPh$_3$)(O$_2$CC$_{13}$H$_{27}$)), was placed while still in solid form in a three-neck flask, gradually heated to 95° C. under a nitrogen atmosphere, and completely melted, after which it was gradually heated to 180° C. under stirring, and this temperature was maintained for 6 hours. After this heat treatment, 50 mL of methanol was added at room temperature, the contents were stirred and then allowed to stand, and the supernatant was then removed. This procedure was repeated three times, and the powder thus obtained was filtered off with a Kiriyama funnel and dried under reduced pressure, which gave black silver nanoparticles (62% yield).

FIG. 8 shows the results (image) of TEM observation of the silver nanoparticles thus obtained. The average particle diameter thereof was 11.3 nm. The silver content was 90.3 wt %. XRD revealed the metal core to be metallic silver. The organic components revealed by GC/MS analysis were $PPh_3$ (m/z=262), $O=PPh_3$ (m/z=277), and $C_{13}H_{27}CO_2H$ (m/z=228).

Figure 1:
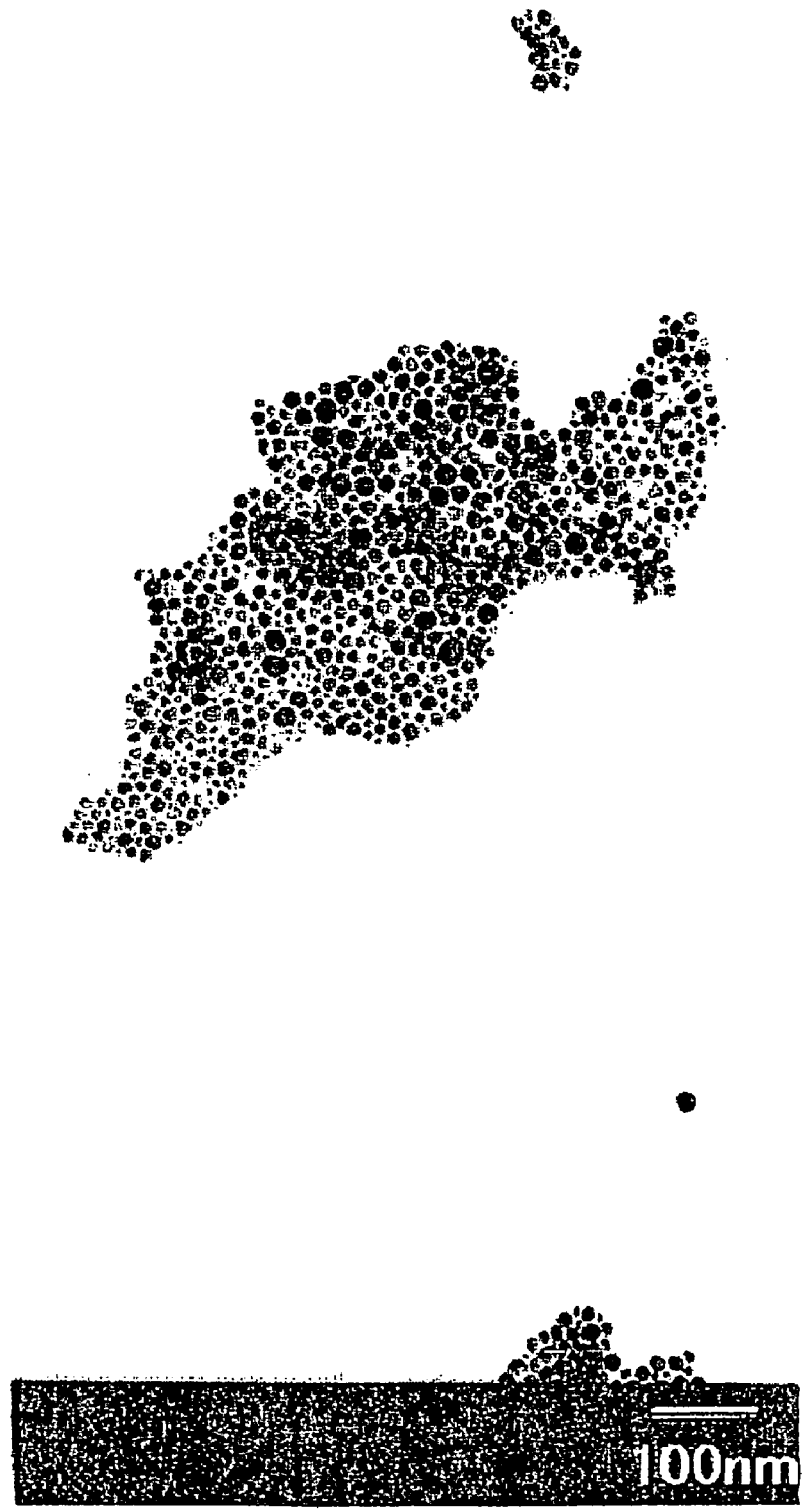
FIG. 1 is an image illustrating the results of TEM observation of the silver nanoparticles obtained in Example 1-1.
Figure 2:
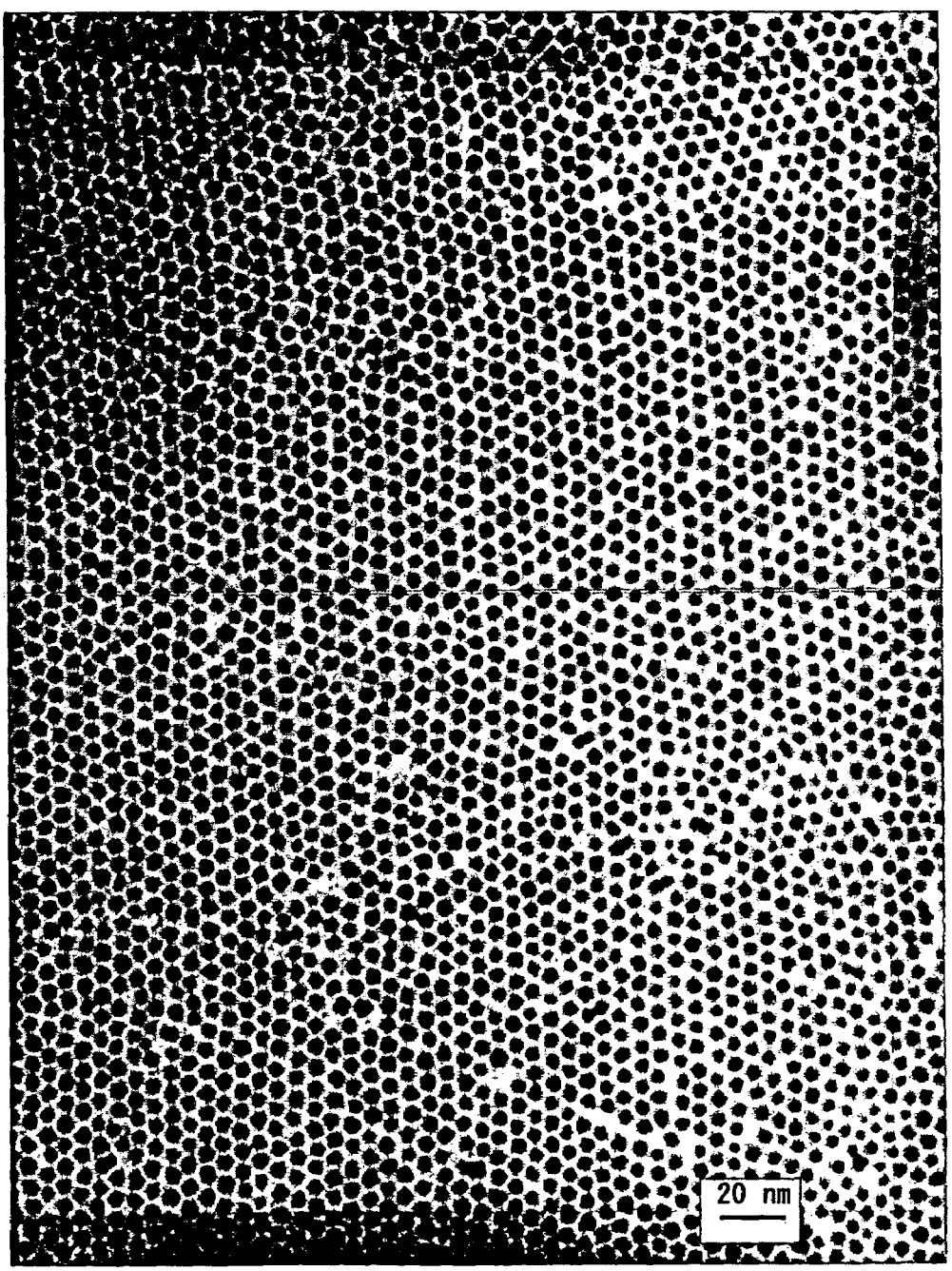
FIG. 2 is an image illustrating the results of TEM observation of the silver nanoparticles obtained in Example 1-7.
Figure 3:
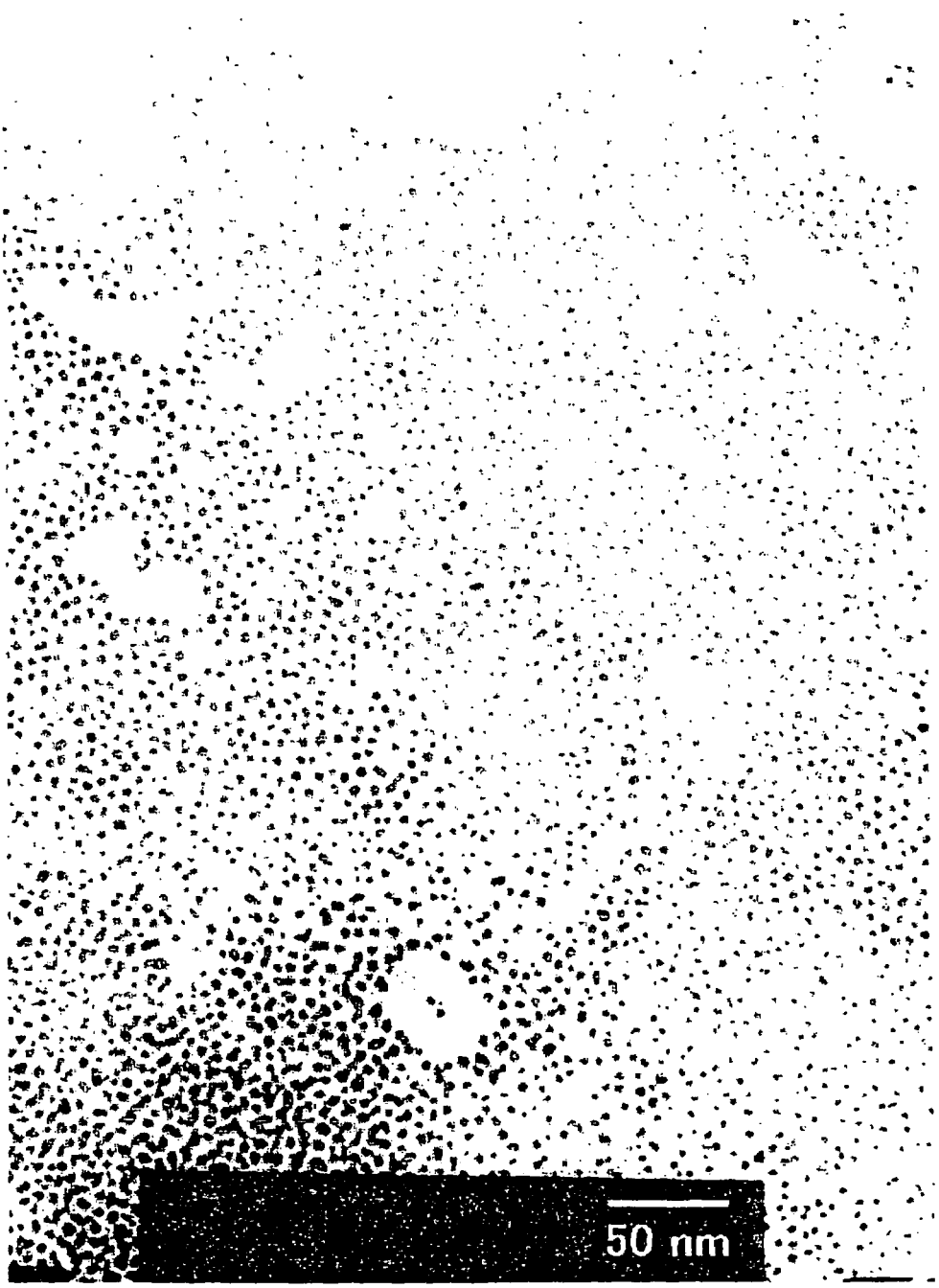
FIG. 3 is an image illustrating the results of TEM observation of the silver nanoparticles obtained in Example 1-13.
Figure 4:
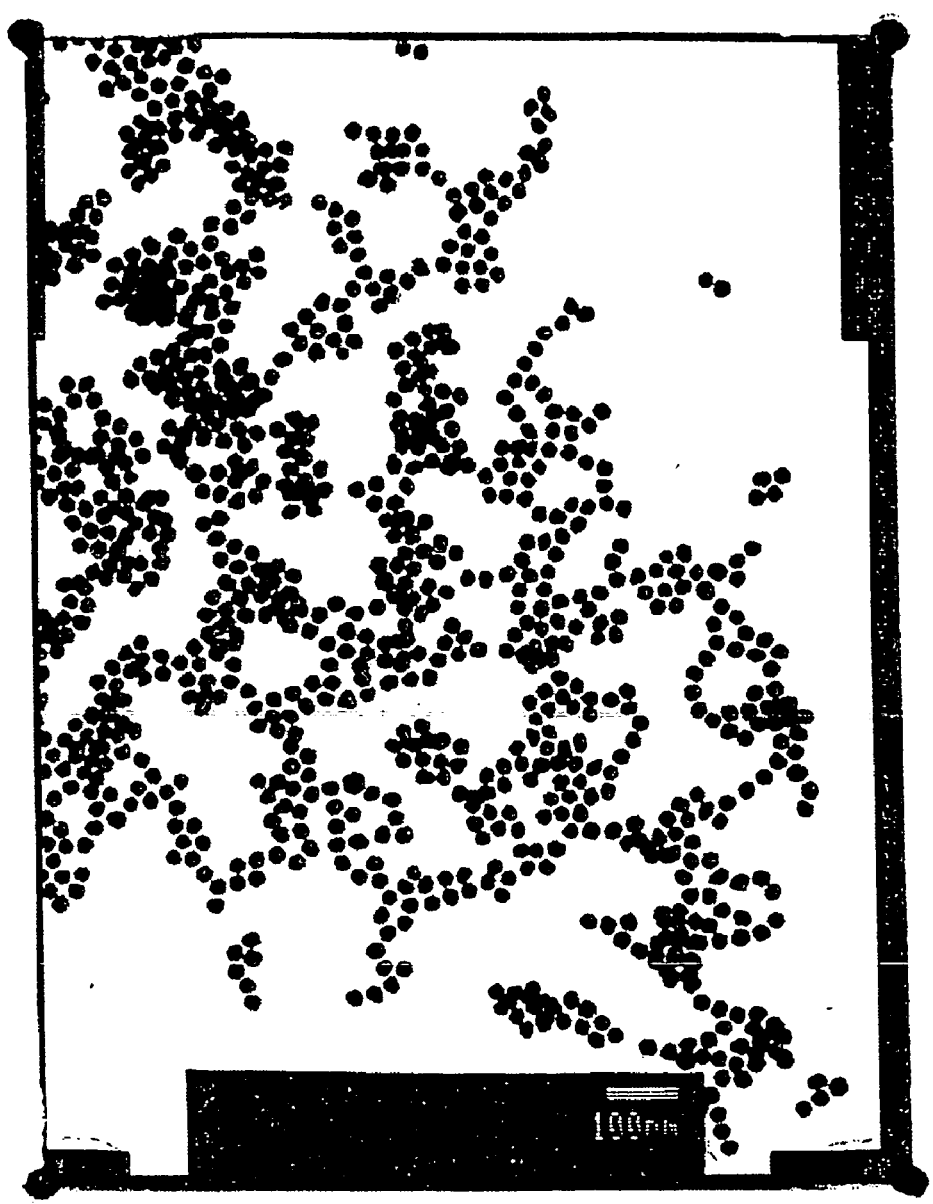
FIG. 4 is an image illustrating the results of TEM observation of the particles obtained in Example 2-1.
Figure 5:
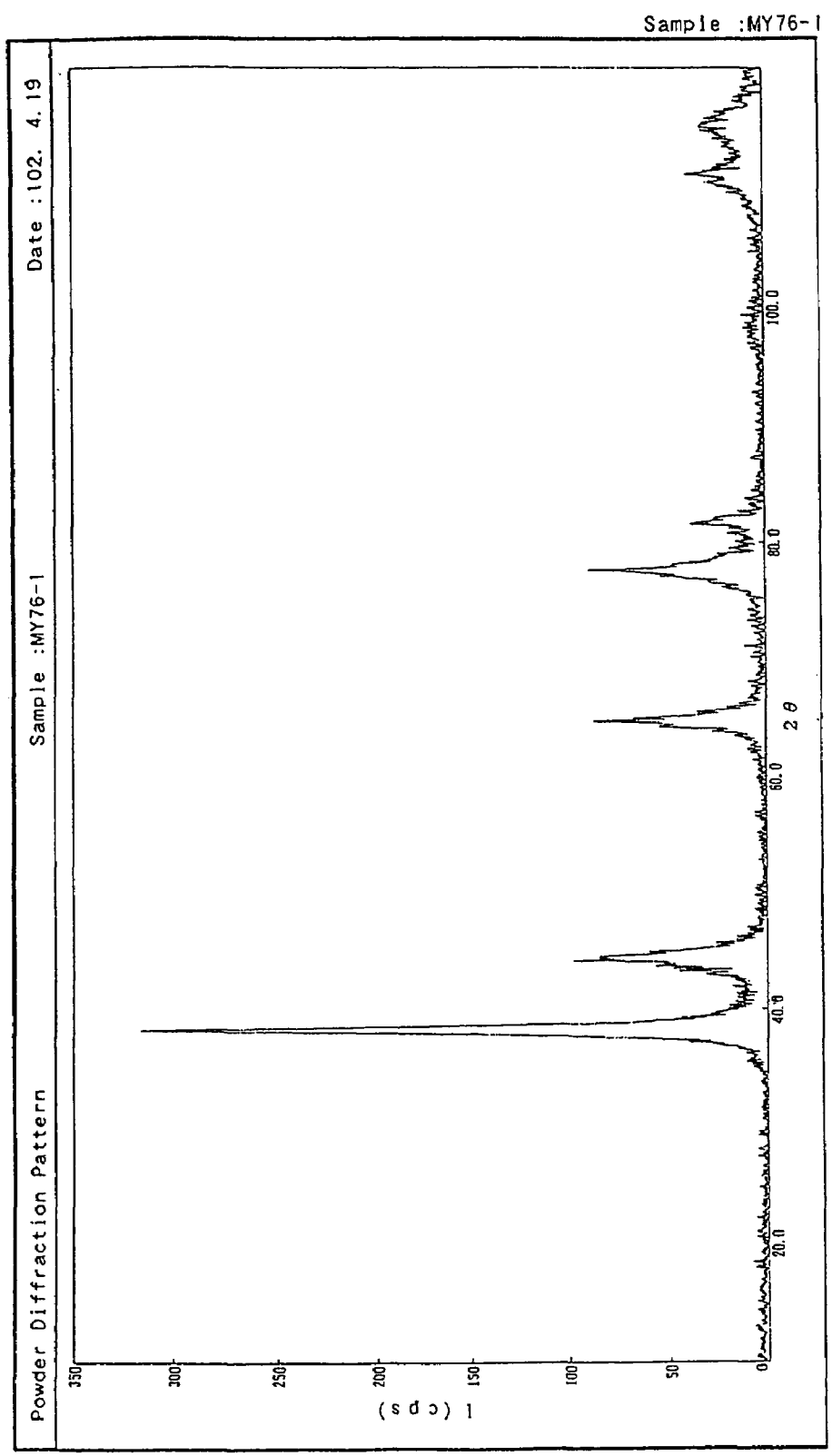
FIG. 5 is a graph of the results of power X-ray diffraction analysis of the particles obtained in Example 2-1.
Figure 6:
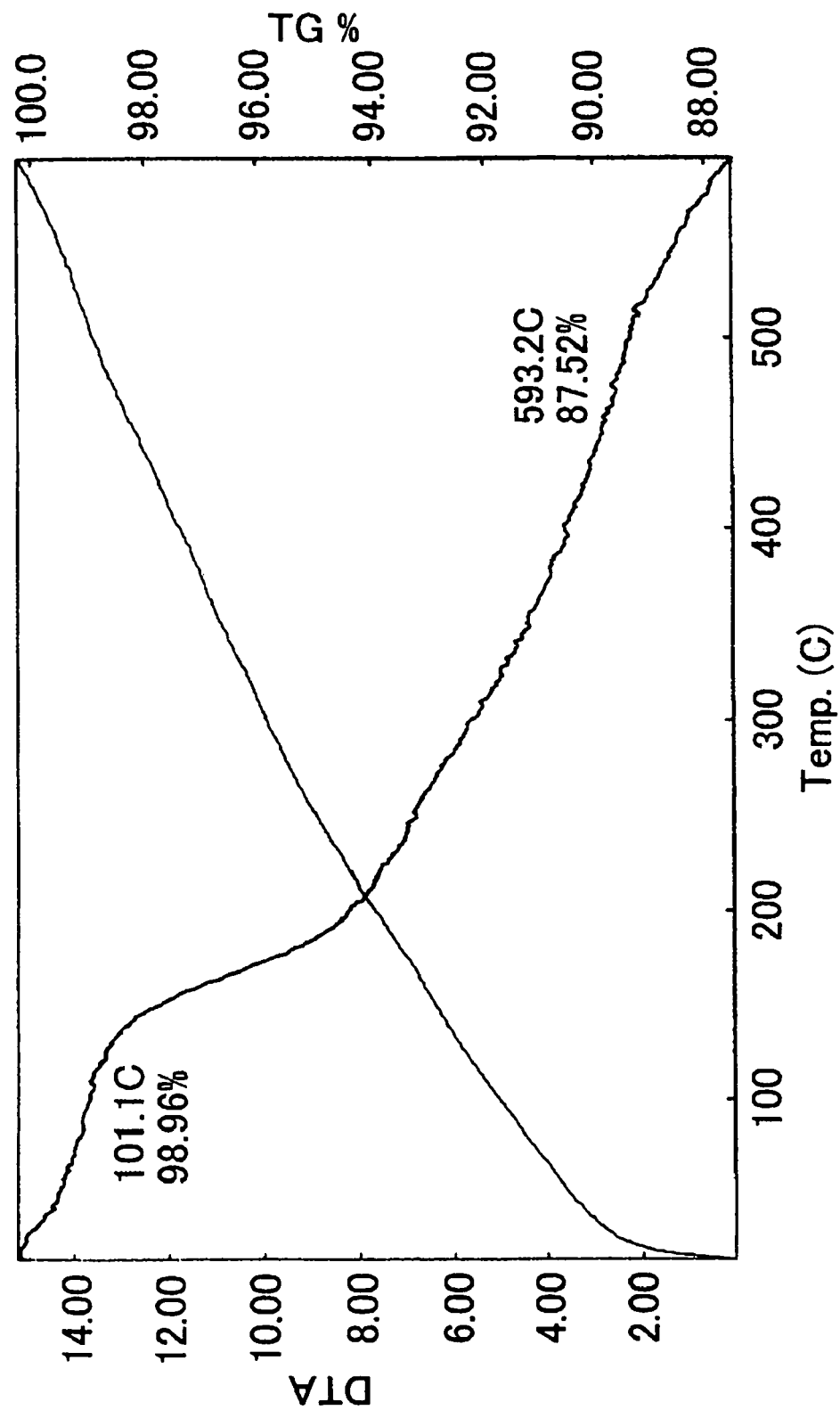
FIG. 6 is a graph of the results of thermal analysis of the particles obtained in Example 2-1.
Figure 7:
FIG. 7 is an image illustrating the results of TEM observation of the silver nanoparticles obtained in Example 3-1.
Figure 8:
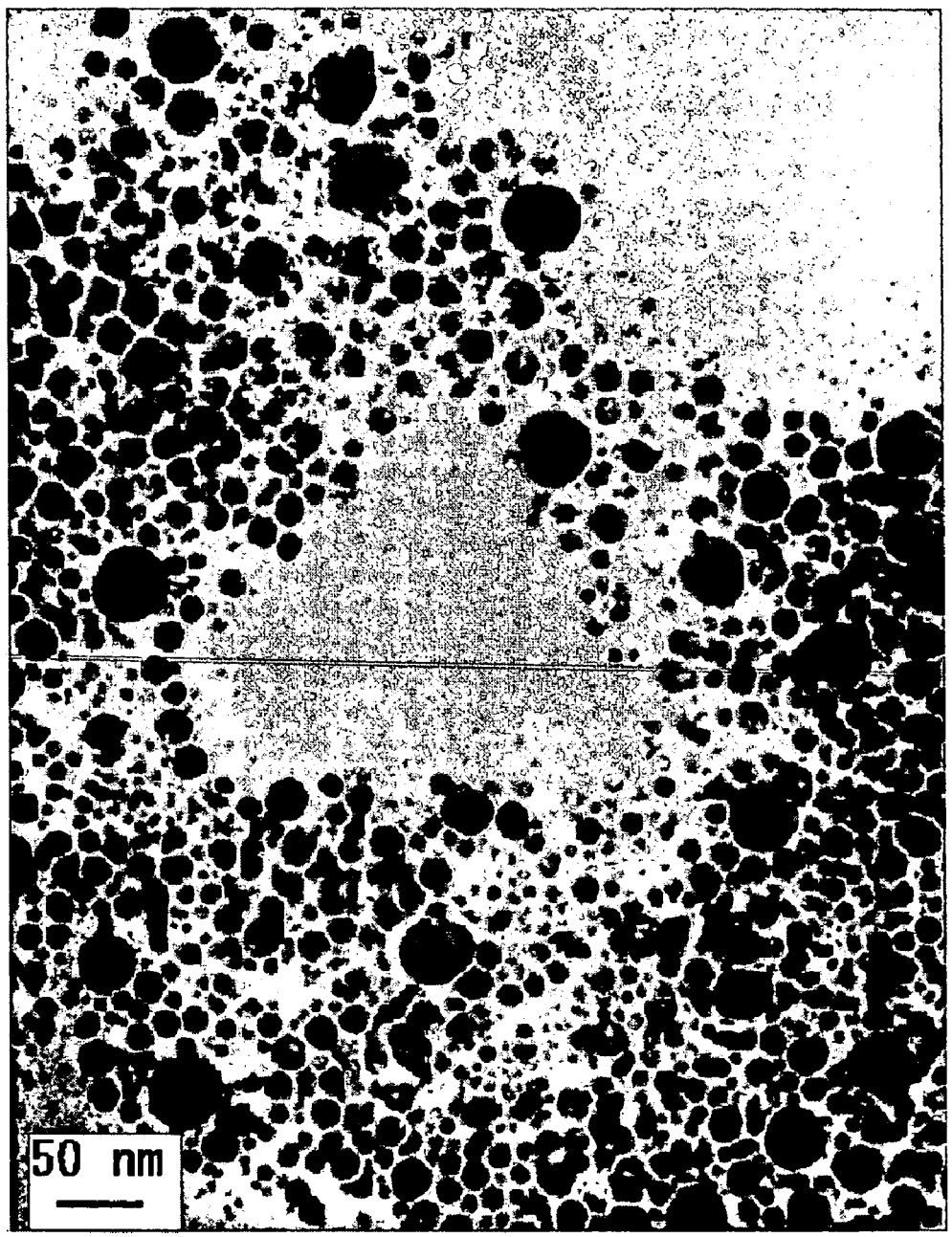
FIG. 8 is an image illustrating the results of TEM observation of the silver nanoparticles obtained in Example 3-2.

The invention claimed is:

1. A method for manufacturing metal nanoparticles by heat treating a starting material containing a metal salt and a fatty acid, in the presence of an amine compound and in an inert gas atmosphere, wherein the amine compound and the starting material containing a metal salt and a fatty acid are solid at the beginning of said heat treatment.

2. The method according to claim 1, wherein the metal salt is at least one of (1) metal carbonates, (2) fatty acid salts, and (3) metal complexes.

3. The method according to claim 1, wherein an organic solvent is not used.

4. A method for manufacturing metal nanoparticles by heat-treating in an inert gas atmosphere a metal complex having a phosphine ligand and a carboxylate ligand, wherein the metal complex is a solid at the beginning of said heat treatment.

5. The manufacturing method according to claim 4, wherein the heat treatment temperature is within a temperature range such that weight loss will be from 1 to 50% when said metal complex is subjected to thermogravimetric analysis.

6. The manufacturing method according to claim 4, wherein the metal complex has no ligands other than a phosphine ligand and a carboxylate ligand.

7. A method for manufacturing metal nanoparticles which comprises a step of heat-treating a mixture containing (1) phosphine and (2) (i) a metal salt of a fatty acid or (ii) a fatty acid and a metal salt in an inert gas atmosphere, wherein the mixture is a solid at the beginning of said heat treatment.

* * * * *